(12) United States Patent  (10) Patent No.: US 9,148,935 B2
Mohan et al.  (45) Date of Patent: Sep. 29, 2015

(54) DUAL-TECHNOLOGY OCCUPANCY DETECTION

(75) Inventors: Tanuj Mohan, Sunnyvale, CA (US); Joseph Basil Curasi, Morgan Hill, CA (US); Zachary Gentry, Sunnyvale, CA (US); Premal Ashar, Sunnyvale, CA (US); Sanjeev Patel, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 706 days.

(21) Appl. No.: 13/466,483

(22) Filed: May 8, 2012

(65) Prior Publication Data

US 2013/0069543 A1 Mar. 21, 2013

Related U.S. Application Data

(63) Continuation-in-part of application No. 13/304,503, filed on Nov. 25, 2011, now Pat. No. 8,558,466.

(60) Provisional application No. 61/537,180, filed on Sep. 21, 2011.

(51) Int. Cl.
*H05B 37/02* (2006.01)
*G08B 13/19* (2006.01)
*G08B 13/189* (2006.01)
*G08B 17/12* (2006.01)
*G08B 19/00* (2006.01)
*G05D 23/19* (2006.01)

(52) U.S. Cl.
CPC ............ *H05B 37/0218* (2013.01); *G05D 23/19* (2013.01); *G08B 13/1895* (2013.01); *G08B 13/19* (2013.01); *G08B 17/12* (2013.01); *G08B 19/005* (2013.01); *H05B 37/0227* (2013.01); *H05B 37/0245* (2013.01); *Y02B 20/44* (2013.01); *Y02B 20/46* (2013.01)

(58) Field of Classification Search
USPC .................................................. 315/149–159
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 5,946,209 A * | 8/1999 | Eckel et al. ............... 700/14 |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,382,271 B2 | 6/2008 | McFarland |

(Continued)

*Primary Examiner* — Brandon S Cole
(74) *Attorney, Agent, or Firm* — Brian R. Short

(57) ABSTRACT

Apparatuses, methods and systems for dual-technology occupancy detection are disclosed. One dual-technology occupancy detection apparatus includes a motion sensor sensing motion, an ambient light sensor sensing variation in ambient light, and a controller for detecting occupancy and controlling a building environmental parameter based on the sensed motion and the sensed variations in ambient light. One method of detecting occupancy for controlling lighting includes sensing motion with a motion sensor, sensing variations in ambient light with an ambient light sensor, and detecting occupancy and controlling activation of a light based on the sensed motion and the sensed variations in ambient light.

30 Claims, 13 Drawing Sheets

(56) References Cited

U.S. PATENT DOCUMENTS

| | | |
|---|---|---|
| 7,437,596 B2 | 10/2008 | McFarland |
| 7,550,931 B2 | 6/2009 | Lys et al. |
| 7,566,137 B2 | 7/2009 | Veskovic |
| 7,792,956 B2 | 9/2010 | Choong et al. |
| 7,925,384 B2 | 4/2011 | Huizenga et al. |
| 7,999,485 B1 * | 8/2011 | Richards et al. ............ 315/247 |
| 2004/0002792 A1 | 1/2004 | Hoffknecht |
| 2005/0169643 A1 | 8/2005 | Franklin |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0069908 A1 * | 3/2007 | St-Germain ............ 340/686.1 |
| 2007/0086128 A1 | 4/2007 | Lane et al. |
| 2007/0215794 A1 | 9/2007 | Cernasov et al. |
| 2008/0185597 A1 | 8/2008 | Wu |
| 2008/0244104 A1 | 10/2008 | Clemente |
| 2008/0265796 A1 | 10/2008 | Null et al. |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0141153 A1 * | 6/2010 | Recker et al. ............ 315/149 |
| 2010/0264846 A1 | 10/2010 | Chemel et al. |
| 2010/0270933 A1 | 10/2010 | Chemel et al. |
| 2010/0295482 A1 | 11/2010 | Chemel et al. |
| 2010/0301777 A1 | 12/2010 | Kraemer |
| 2010/0327766 A1 * | 12/2010 | Recker et al. ............ 315/291 |
| 2011/0031897 A1 | 2/2011 | Henig et al. |
| 2011/0133649 A1 * | 6/2011 | Kreiner et al. ............ 315/86 |
| 2012/0126700 A1 * | 5/2012 | Mayfield et al. ............ 315/86 |

* cited by examiner

Determining a lack of occupancy by sensing motion of less than a threshold for predetermined amount of time
810

Sensing a variation in sense ambient light of greater than a first detect threshold after the predetermined amount of time
820

---

Determining a lack of occupancy by sensing motion of less than a threshold for predetermined amount of time

910

---

Detecting a sensed motion of greater than the threshold after the predetermined amount of time

920

---

Sensing a variation in sense ambient light of greater than a first detect threshold after the predetermined amount of time

930

```
Determining a lack of occupancy by sensing motion of less than a threshold for predetermined
amount of time

1010
```

↓

```
Sensing a cyclic variation in sense ambient light during the predetermined amount of time

1020
```

DUAL-TECHNOLOGY OCCUPANCY DETECTION

RELATED APPLICATIONS

This patent application claims priority to U.S. provisional patent application Ser. No. 61/537,180, filed on Sep. 21, 2011, and is a continuation-in-part (CIP) of U.S. patent application Ser. No. 13/304,503, filed on Nov. 25, 2011, which are herein incorporated by reference.

FIELD OF THE EMBODIMENTS

The described embodiments relate generally to motion detection. More particularly, the described embodiments relate to "dual-technology" occupancy detection.

BACKGROUND

Motion detection is useful for providing intelligent lighting and/or security within, for example, a building. The motion detection can be used to determine whether an occupant is present, and therefore, only provide lighting when an occupant is present. However, false positives in detection can waste energy or incorrectly assume security of the building has been breached. Additionally, if a single technology is used for the motion detection, problems can arise if for some reason the single technology is disabled.

One type of dual-technology sensor includes an ultrasonic motion sensor combined with a passive infrared (PIR) sensor. The dual-technology approach can reduce false-positives due to the redundancy (multiple sensor types) included within the detection. However, ultrasonic technologies can be triggered by motion of inanimate objects (such as, motion of a printer) and PIR sensor can be rendered near useless when exposed to large amounts of IR due to a warm object or sun light coming in through a window of the building.

It is desirable to have a method, system and apparatus for sensing occupancy that does not have the limitations of existing dual technology motion sensors.

SUMMARY

One embodiment includes dual-technology occupancy detection apparatus. The dual-technology occupancy detection apparatus includes a motion sensor sensing motion, an ambient light sensor sensing variation in ambient light, and a controller for detecting occupancy and controlling a building environmental parameter based on the sensed motion and the sensed variations in ambient light.

Another embodiment includes a method of a dual-technology fixture detecting occupancy. The method includes sensing motion with a motion sensor, sensing variations in ambient light with an ambient light sensor, and detecting occupancy and controlling a building parameter based on the sensed motion and the sensed variations in ambient light.

Another embodiment includes another method of detecting occupancy for controlling lighting. The method includes sensing motion by a PIR motion sensor and controlling powering of a light for a predetermined period of time if motion is sensed. The method further includes sensing variations in ambient light with an ambient light sensor. The powering of the light is maintained or overridden based on detection of a person entering, continuously occupying or leaving a space in which the PIR motion sensor and the ambient light detection are located, wherein detection is based on the sensed motion and the sensed variations in ambient light.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in an apparatus, system and method for dual-technology detection of occupancy. For an embodiment, the dual-technology sensor provides for an improvement of detection of passive infrared (PIR) sensor by using an input from an ambient light sensor.

A limitation with PIR sensors can arise if a person is only performing small motions. For example, small movements by a person sitting at a desk typing may not be detected, and thus it appears that the area is unoccupied. The PIR sensor is only able to detect motion—so the person might trigger the sensor and immediately leave the area.

However, the person is always reflective or absorptive and will change the ambient light level when present. That is, an ambient light sensor can detect the presence of a person, even if the person is only exhibiting small motions. Therefore, a dual technology occupancy sensor that includes a PIR sensor and an ambient light sensor can provide addition occupancy detection capabilities.

For an embodiment of a dual technology PIR/ambient light occupancy sensor, as a person enters an unoccupied space the PIR sensor triggers when there is a change in variance (or standard deviation) of the sensed motion from the PIR sensor. Once the space is occupied, the ambient sensor monitors small changes in variance indicating the presence of a person, which may not be large enough to trigger the PIR sensor. The use of the ambient sensor in determining small changes in motion is key to determining whether an area in occupied or not. Thus, the ambient sensor used in conjunction with the PIR sensor enhances the capability of sensing occupancy.

In other words, if no motion is detected from the PIR, however, the ambient light indicates a change in variance, then it can be concluded that an occupant is still present. If both the PIR and Ambient sensors indicate no change in variance, then it can be concluded that the occupant has left the area. Finally, when no more motion is detected, then it can be concluded that the occupant is definitely not present.

Figure 1:
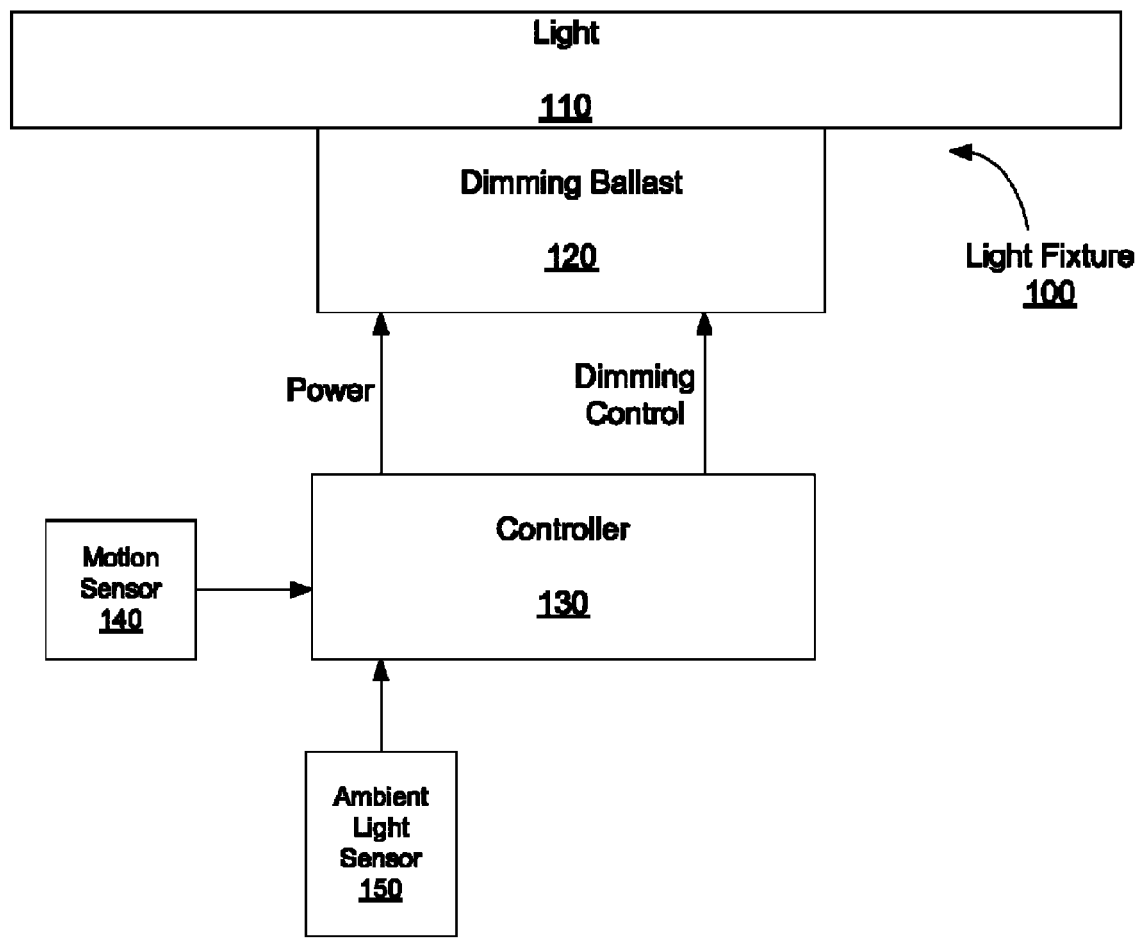
FIG. 1 shows an example of an intelligent light controller that provides lighting control, according to an embodiment.

FIG. 1 shows an example of a light fixture 100. The light fixture 100 includes a light 110, and a dimming ballast 120. As shown, the dimming ballast 120 receives a power input and a dimming control input, and provides a regulated current to the light 110. A controller 130 provides power and/or dimming control to the dimming ballast 120. While the fixture 100 of FIG. 1 controls power and dimming of the light 110, it is to be understood that the embodiments described for detecting occupancy can be additionally or alternatively used for controlling other parameters of a structure or building in which the fixture 100 is located. For example, as will be described, the occupancy detection can be used for controlling temperature (heating and/or ventilation), humidity and/or building security. The described embodiments that include methods of operation can be executed, for example, by the controller 130.

A motion sensor (for example, a passive infrared (PIR) sensor) 140 operates as a motion detector. Embodiments include the controller 130 controlling the power and/or the dimming of the light 110 based on the motion sensor 140. Motion detected within, for example, a room can be used to detect occupancy of a room. The controller 130 provides power to the light 110 when occupancy is detected. For an embodiment, the power is provided for a set period of time.

A severe limitation with using just a motion sensor for detecting occupancy arises when, for example, an occupant (person) enters a room that is lit by the light 110 and remains near motionless for a time greater than the set period of time. If the motion is small enough, the motion sensor will not properly detect occupancy, and the controller 130 will turn the light off after the set period of time. Another limitation arises when, for example, the occupant leaves the room. The motion sensor properly detects motion of the occupant, but if the occupant leaves the room, the controller 130 maintains power to the light for the set period of time—wasting energy because the occupant has left the room, and powering the light 110 is useless.

The embodiment of FIG. 1 further includes an ambient light sensor 150. The ambient light sensor greatly improves the intelligence of the controller 130. For the situation in which the occupant is near motionless, the ambient light sensor 150 will still detect the presence of the occupant. The controller 130 can utilize this information and maintain power to the light 110. Additionally, if the occupant leaves, the sensed level of the ambient light sensor will fall to near zero (or near-zero), indicating that the occupant has left. The controller 130 can then turn the light 110 off, thereby saving power.

Figure 2A:
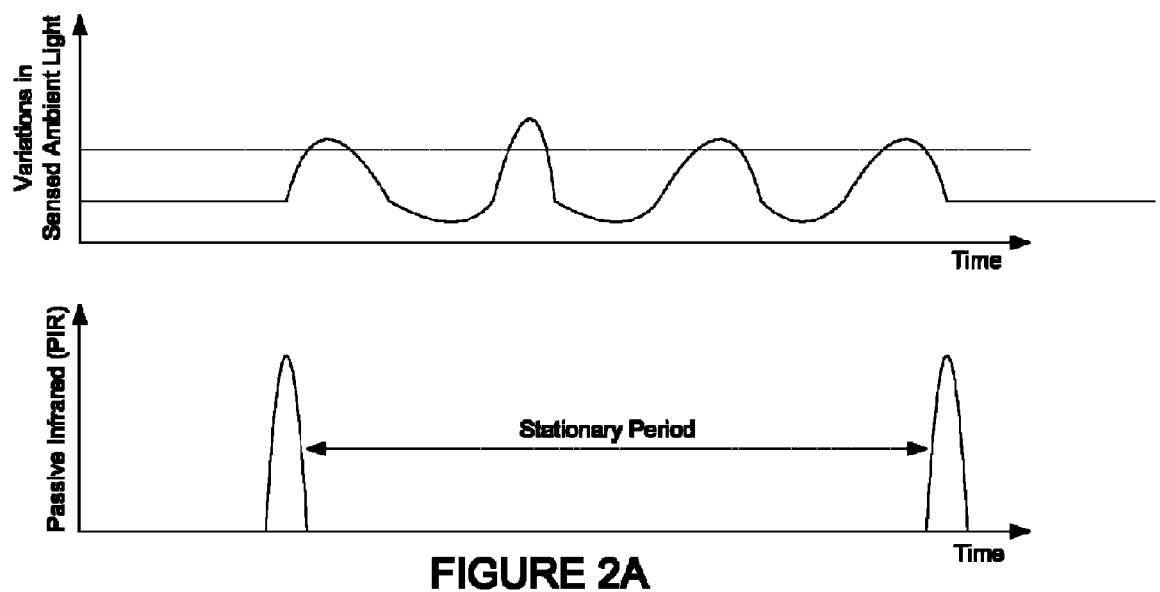
FIG. 2A shows examples of time lines showing variations in sensed ambient light and sensed passive infrared light during occupant motion shown in FIG. 2B.
Figure 2B:
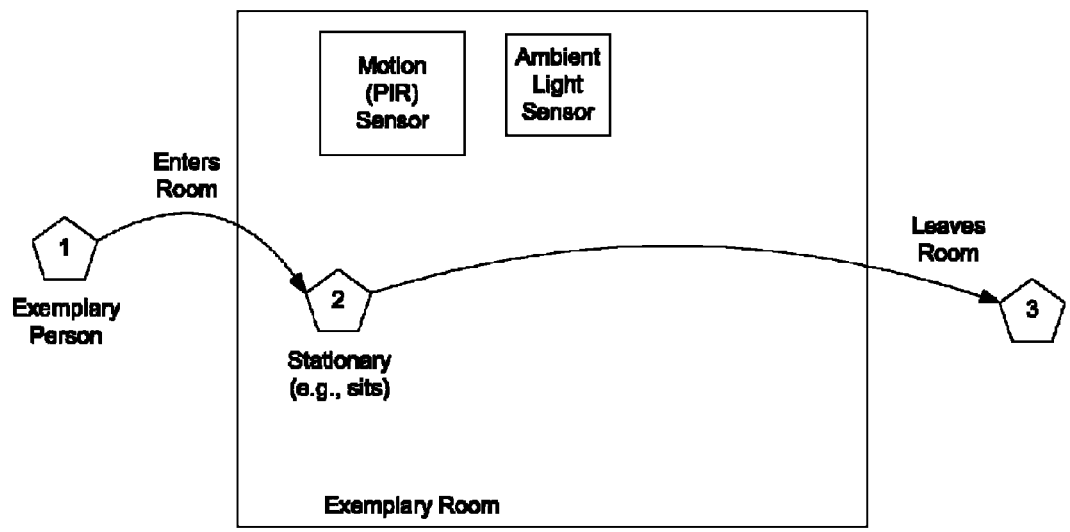
FIG. 2B shows an example of motion of an occupant through an exemplary room.

FIG. 2A shows examples of time lines showing variations in sensed ambient light and sensed passive infrared light during occupant motion shown in FIG. 2B. FIG. 2B shows an exemplary room, and the actions of an occupant as the occupant enters, occupies and leaves the exemplary room. As shown, initially an exemplary person (occupant) is outside of the room (labeled 1). When the person enters the room, the PIR sensor senses the motion which the controller 130 can use to power (turn on) the light 110. Next, the person remains near stationary for some period of time (labeled 2). During this near stationary period, the ambient light sensor senses the presence of the person due to fluctuations in variance (or standard deviation) from the ambient sensor. The small fluctuations are due to small motions of the occupant.

The controller 130 can further utilize this information to maintain power to the light 110 as the ambient light sensor indicates that the person is still occupying the room even though the PIR sensor no longer senses motion. Finally, the person leaves the room (labeled 3). Clearly, the PIR sensor senses the motion of the person with a strong variance signal. However, once the person has left the room, the ambient light sensor no longer senses a change in variance and the controller 130 can use this information to turn off the light, thereby saving power.

Figure 3:
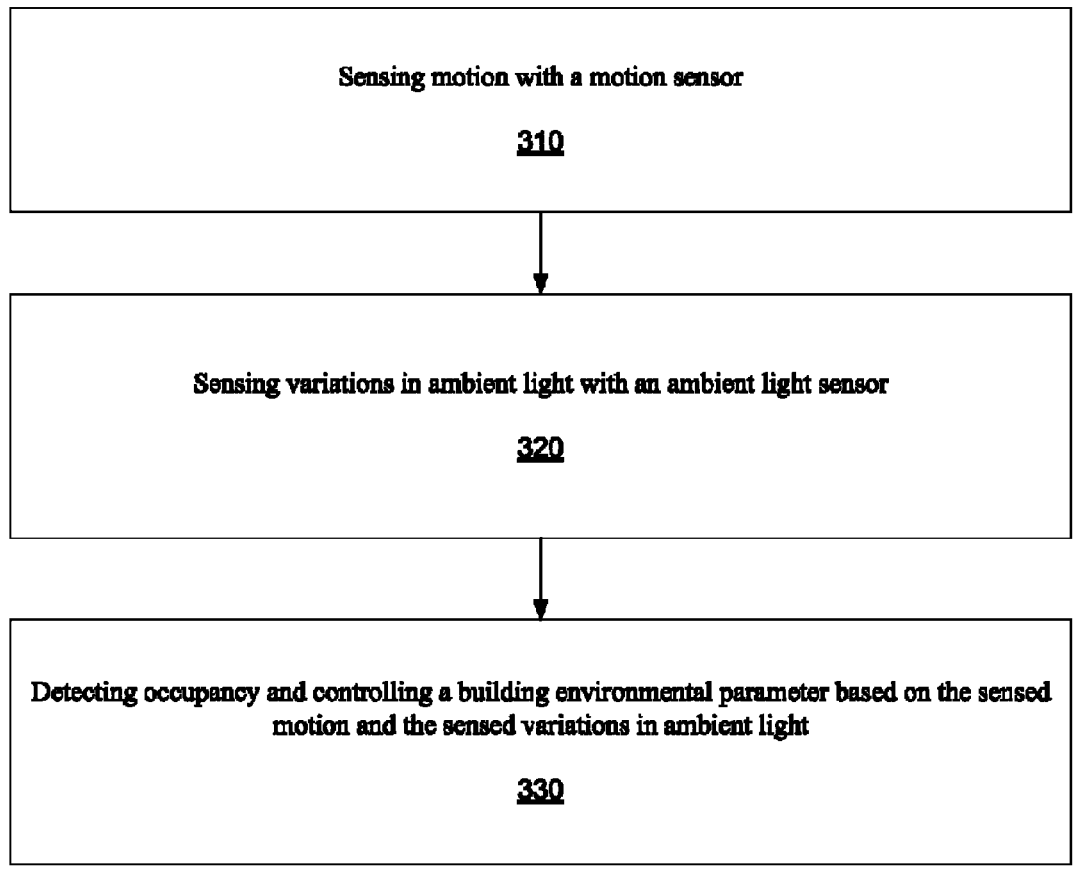
FIG. 3 is a flow chart that includes the steps of an embodiment of a method of detecting occupancy of, for example, a room.

FIG. 3 is a flow chart that includes the steps of an embodiment of a method of detecting occupancy of, for example, a room. A first step 310 includes sensing motion. A second step 320 includes sensing variations in ambient light with an ambient light sensor. A third step 330 includes detecting occupancy and controlling a building environmental parameter (by, for example, a controller of a dual-technology occupancy detection apparatus) based on the sensed motion and the sensed variations in ambient light.

For various embodiments, the building environmental parameter includes activation of a light, an intensity of the light, temperature, humidity, or even security control of a building or structure in which the occupancy is being detected. The building environmental parameter can include any type of building control that can utilize detection of occupancy within the building or structure.

As described, for an embodiment, the sensing motion includes a PIR (passive infrared) motion sensor sensing the motion. An embodiment further includes activating the light for a predetermined period of time upon sensing motion greater than a threshold. Further, an embodiment includes extending the activation of the light beyond the predetermined period if the ambient light is sensed to have variations greater than a threshold. Further, an embodiment includes over-riding the activation of the light within the predetermined period if the ambient light is sensed to have variations less than the threshold.

Events and sequences of events can be identified by monitoring the sense motion and sensed ambient light. An embodiment includes matching the sensed motion with one of a plurality of stored patterns of events, and identifying an event associated with the sensed motion based on a match between a one of the plurality of patterns and the sensed motion.

As described, an embodiment includes sensing motion with an IR sensor, and detecting occupancy and controlling activation of the light based on the sensed motion and the sensed variations in ambient light.

Utilizing the dual-technology sensors, and the methods of determining variances in the sensed signals, and the signature matching of the sensed signals, emergency conditions can be identified. An embodiment includes identifying a fire within a structure in which at least one motion sensor and at least one ambient sensor are located. For a specific embodiment, a fire is identified by identifying a particular sequence of events. More specifically, fire is identified by determining a lack of occupancy by sensing motion of less than a threshold for predetermined amount of time, detecting a sensed motion of greater than the threshold after the predetermined amount of time, and sensing a variation in sense ambient light of greater than a first detect threshold after the predetermined amount of time. An embodiment further includes fire being detected if at least N of M motion sensors and ambient light sensors detect the sequence of events. Once detected, an embodiment includes a controller of the dual-technology detector communicating a fire alert to an external controller if fire is identified.

Another embodiment of emergency detection includes identifying smoke within a structure in which a plurality of motion sensors and a plurality of ambient sensors are located. For this embodiment, smoke is detected for a sequence of events, including determining a lack of occupancy by sensing motion of less than a threshold for predetermined amount of time, and sensing a variation in sense ambient light of greater than a first detect threshold after the predetermined amount of time. An embodiment includes smoke being identified if at least N of M motion sensors and ambient light sensor detect the sequence of events. Once detected, an embodiment includes a controller of the dual-technology detector communicating a fire alert to an external controller if smoke is identified.

Another embodiment of emergency detection includes identifying a water leak within a structure in which a plurality of motion sensors and a plurality of ambient sensors are located. For this embodiment, a water leak is detected for a sequence of events, including determining a lack of occupancy by sensing motion of less than a threshold for predetermined amount of time, and sensing a cyclic variation in sense ambient light during the predetermined amount of time. An embodiment includes the water leak being identified if at least N of M motion sensors and ambient light sensor detect the sequence of events.

Another embodiment that can utilize the motion sensor only includes detecting a lack of occupancy if the motion sensor senses a motion above a major motion threshold, followed by sensing motion of less than a minor motion threshold for a preselected period of time after sensing motion above the major motion threshold.

Another embodiment includes light harvesting. Light harvesting is a process in which ambient light is sensed. If the ambient light is sensed to be greater than a threshold, then an intensity of a light within a structure in which the dual-technology sensor is located is decreased. The assumption is that sun light may be entering through, for example, a window of the structure. Light can be harvested, and therefore, energy saved by reducing the intensity of light generated within the structure. However, the ambient light sensor can be fooled if for example, a large, brightly colored man passed beneath the ambient sensor. To prevent the dual-technology sensor from being fooled, the sensing of the ambient light sensor can be validated by the motion (for example, PIR) sensor sensing motion. If motion is sensed, then is can be assumed that the ambient light sensor is not getting an accurate reading. To address this problem, an embodiment includes a controller within the dual-technology occupation sensor being operative to light harvesting upon sensing ambient light greater than a threshold, wherein light harvesting comprises reducing an intensity of a light when ambient light is sensed greater than the threshold. However, the controller is further operative to over-ride the light harvesting if the sensed ambient light greater than the threshold occurs during a period in which motion is sensed greater than an occupancy threshold. That is, the motion sensed greater than the occupancy threshold indicated that a person may be below that light, and the presence of this person may be yielding the ambient light sensor to be inaccurate.

Figure 4:
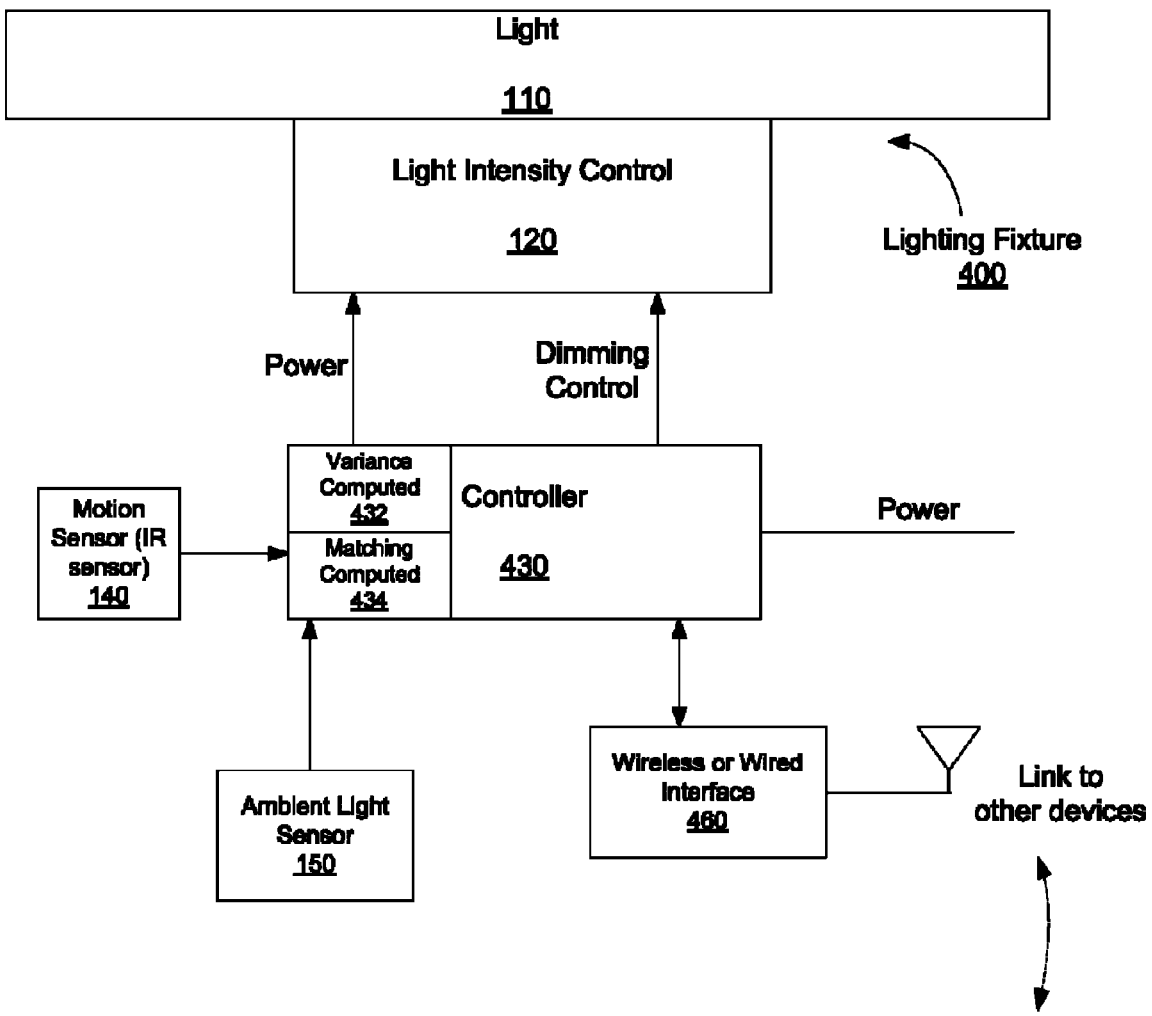
FIG. 4 shows an example of an intelligent light controller that provides lighting control that includes variance and matching calculations of sensed signals (motion and/or ambient light), according to an embodiment.

FIG. 4 shows an example of an intelligent light fixture 400 that provides lighting control (or other environmental control) that includes variance and matching calculations of sensed signals (motion and/or ambient light), according to an embodiment. As shown, a controller 430 includes variance computation 432 and matching computation 434. As will be described, sensed signals of the sensed motion and/or sensed ambient can be processed to determine a variance of the sensed signals. Additionally, or alternatively, the sensed signals can be matched with predetermined sequences for allowing for the identification of events. Sequences of events can be matched with predetermined sequences of events, allowing the identification of sequences of events.

FIG. 4 additionally includes a wireless or wired communication interface 460 that allows the controller 430 to communicate with other lighting fixtures (or other environment control fixtures) and/or to a central controller. That is, the communication interface 460 provides a link between the lighting fixture 400 and other devices.

Figure 5:
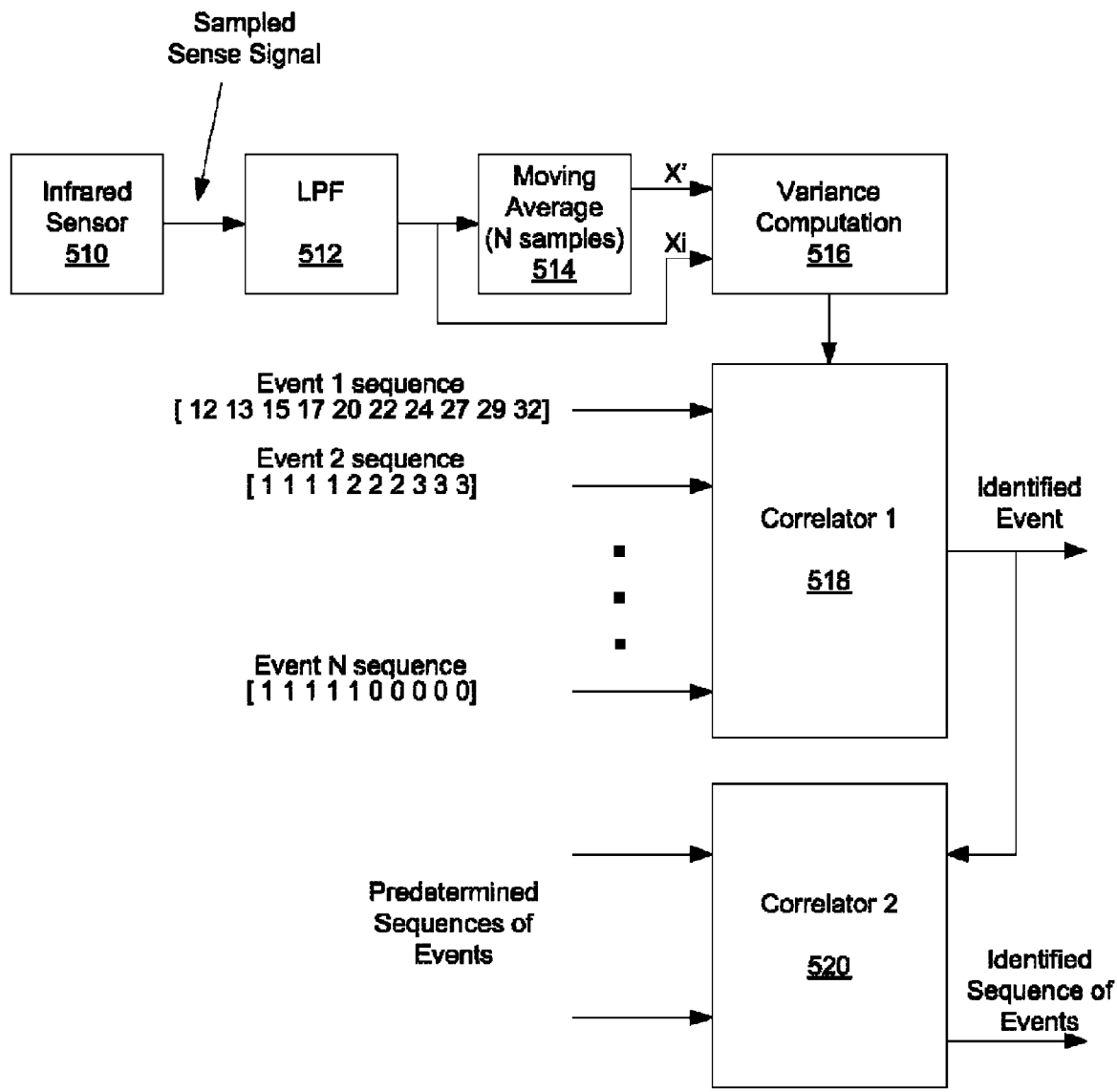
FIG. 5 shows a block diagram of variance computation and sensed signal matching, according to an embodiment.

FIG. 5 shows a block diagram of variance computation and sensed signal matching, according to an embodiment. The embodiments of variance computation and sensed signal matching can be utilized by the described intelligent controllers and fixtures, and aid occupancy and event detection. This embodiment includes an infrared (IR) sensor 510 that generates digital samples of a sensed IR signal. The sensed IR signal is filtered with an anti-aliasing low pass filter (LPF) 512. The filtered signal is averaged over N samples (514). The number of samples N is selectable and adaptive, but an embodiment can advantageously select N to be a power of two to reduce processing complexity. A variance computation block 516 receives the averaged signal (X') and the instantaneous samples (Xi) and generates a variance signal. A correlator 518 matches the variance signal with a one of stored event sequences to provide identification of an event based upon the sensed signal of the IR sensor 510.

Embodiments include the stored event sequences being of length less than or equal to the number of samples N. Event sequences need not be of equal lengths. Prefixing, annexing, or inserting an event sequence with zeros effectively shortens or divides its sequence.

For at least some embodiments, the correlation is computed by comparing each instantaneous sample to its corresponding value in each of the stored event sequences for all N samples. If an instantaneous sample meets or exceeds its corresponding value of a stored event, a logical TRUE bit is set for that sample of that event. An event is detected when all N samples are TRUE, and the selected event is that of the highest priority.

A second correlator 520 can be included for matching sequences of identified events, thereby providing more information about activities occurring in the structure (for example, a room of a building).

If, for example, a person (occupant) is walking through a room (structure), a unique sequence of events is output from correlator 518 due to the IR sensor 510. This sequence of events is input to correlator 520 at a non-uniform rate. If one such predetermined sequence of events is defined as an alternating pattern of small lobe and large lobe events, correlator 520 outputs the identified sequence of events.

Since there are numerous possible combinations and permutations of identified events output from correlator 518, the queue of length M of correlator 520 must be chosen to be of sufficient length to correlate with its predetermined sequences of events. A sample count may be utilized to time-tag identified events and thereby identify those events that should be discarded.

Figure 6:
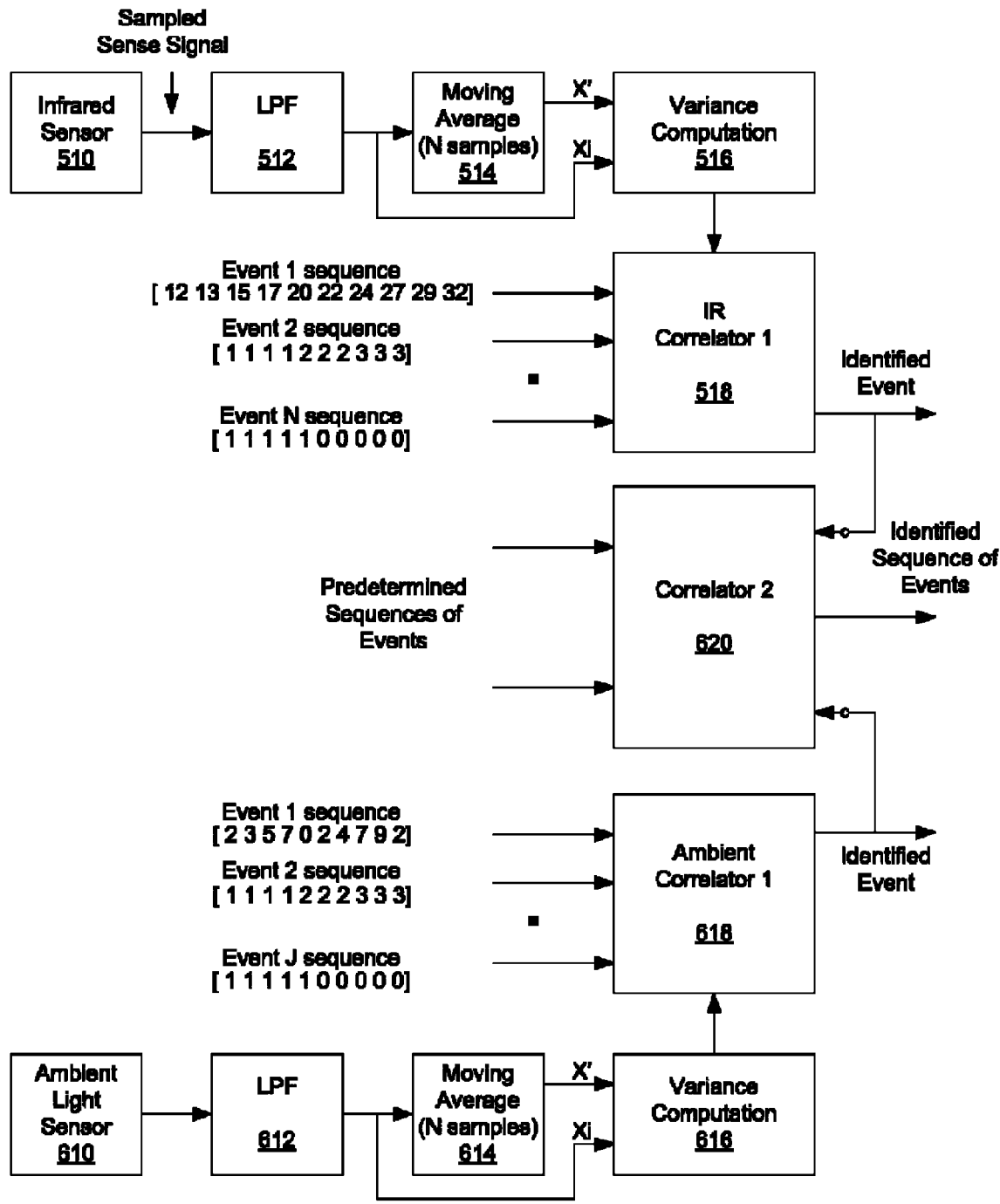
FIG. 6 shows a block diagram of variance computation and sensed signal matching for multiple sensed signals, according to an embodiment.

FIG. 6 shows a block diagram of variance computation and sensed signal matching for multiple sensed signals, according to an embodiment. In addition to the Infrared sensor 510 and associated event identification circuitry of FIG. 5, the embodiment of FIG. 6 additionally includes the ambient light sensor 610 that generates digital samples of a sensed ambient light signal. The sensed ambient light signal is filtered with an anti-phasing low pass filter (LPF) 612. The filtered signal is averaged over N samples (614). The number of samples N is selectable and adaptive, but an embodiment can advantageously select N to be a power of two to reduce processing complexity. A variance computation block 616 receives the averaged signal (X') and the instantaneous samples (Xi) and generates a variance signal. A correlator 618 matches the variance signal with a one of stored event sequences to provide identification of an event based upon the sensed signal of the ambient light sensor 610.

The second correlator 620 of FIG. 6 can receive identified events from both the correlator 518 and the ambient correlator 618 provides matching of sequences of identified events, thereby providing more information about activities occurring in the structure (for example, a room of a building).

The ambient light sensor 610 and associated event detection logic can be useful if, for example, motion within the structure where the sensors are located is small, and therefore, the variations of the sensed IR signal are small. The ambient light detector 610 and associated event detection circuitry can also help minimize false detections of events. For example, a standalone PIR sensor will falsely detect motion when placed in a structure in which there is significant hot air flow. The ambient light detector can be used to corroborate motion detection from the PIR sensor. Because the air flow does not trigger motion detection in the ambient light sensor, the PIR sensor's false motion triggers are ignored.

Figure 7:
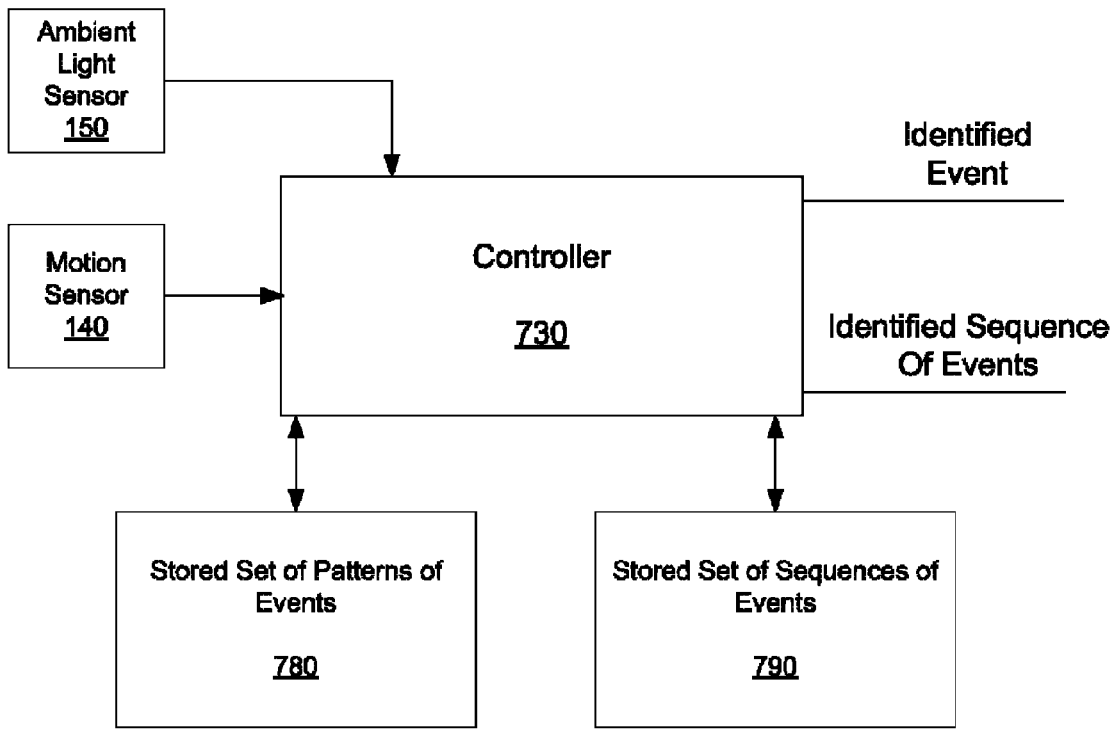
FIG. 7 shows a high-level block diagram of an intelligent light controller that includes event detection, and sequence of events detection, according to an embodiment.

FIG. 7 shows a high-level block diagram of an intelligent light controller that includes event detection, and sequence of events detection, according to an embodiment. Utilizing, for example, the embodiments of FIG. 5 and FIG. 6, a controller 730 can identify events by comparing sensed signals with store sets of patterns of events 780. Based on the comparing, the controller 730 can identify events that may have occurred within a structure in which the intelligent light controller (fixture) is located. Further, the controller 730 can identify sequences of events by comparing sequences of identified events with a set of stored sequences of events 790. Based on the identified events, and identified sequences of events, the controller 730 can intelligently guesstimate or deduce whether there are occupants within the structure of the intelligent light controller, and guesstimate or deduce activities and/or events that have or will occur within the structure. Both occupancy detection and activity detection can be used to intelligently control lighting and environmental parameters of the structure or building. Examples of such activities that are very useful to identify include fire detection, smoke detection and water leak detection. Clearly, a variety of useful activities can be identified to aid in the control of light or other environmental parameters of a structure of the dual-technology occupancy detector.

Figures 8A, 8B:
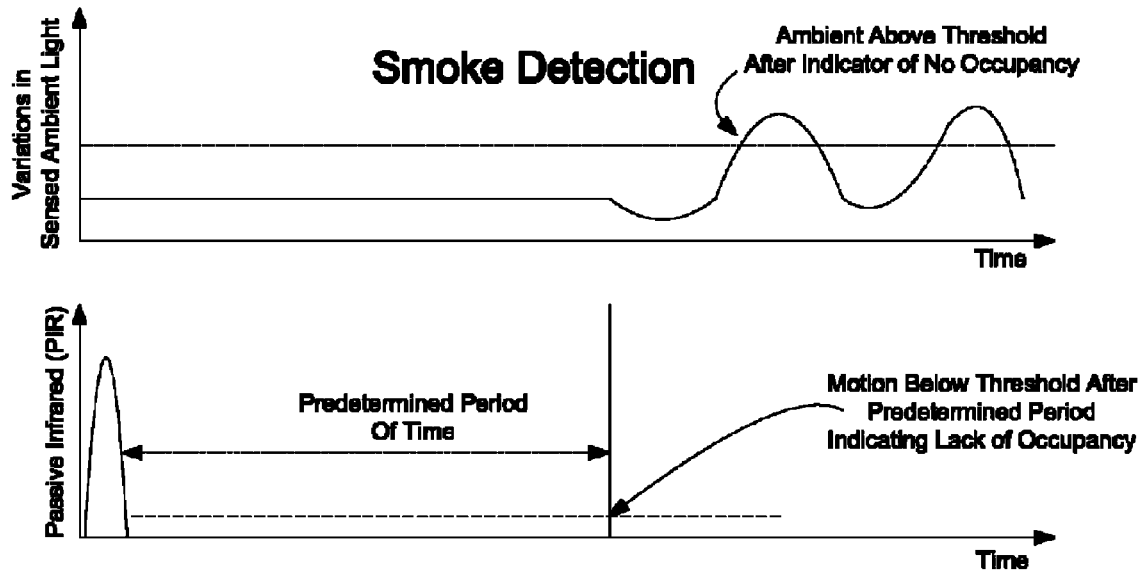
FIG. 8A shows examples of time lines showing variations in sensed ambient light and sensed passive infrared light during smoke detection, according to an embodiment.
FIG. 8B is a flow chart that includes steps of a method of detecting smoke, according to an embodiment.

FIG. 8A shows examples of time lines showing variations in sensed ambient light and sensed passive infrared light during smoke detection, according to an embodiment. Smoke Detection (without fire) may be solely monitored by a single ambient detector. Fluctuations in the variance of the opacity of the smoke wilt indicate its presence. A system comprised of multiple sensors can predict the presence of smoke more accurately than a single sensor. In addition, a system comprised of multiple sensors can more easily pinpoint the smoke to its origin.

As shown if FIG. 8A, a lack of occupancy is established by observing motion detection below a threshold for a predetermined amount of time. For example, if no motion is observed within a room or structure for a period of 5 hours, it can be safely assumed that there are not occupants. However, if variations in sense ambient light are observed (sensed) when it has been established that there are no occupants, it can be concluded that smoke is present.

FIG. 8B is a flow chart that includes steps of a method of detecting smoke, according to an embodiment. A first step 810 includes determining a lack of occupancy by sensing motion of less than a threshold for predetermined amount of time. A second step 820 includes sensing a variation in sense ambient light of greater than a first detect threshold after the predetermined amount of time.

Figures 9A, 9B:
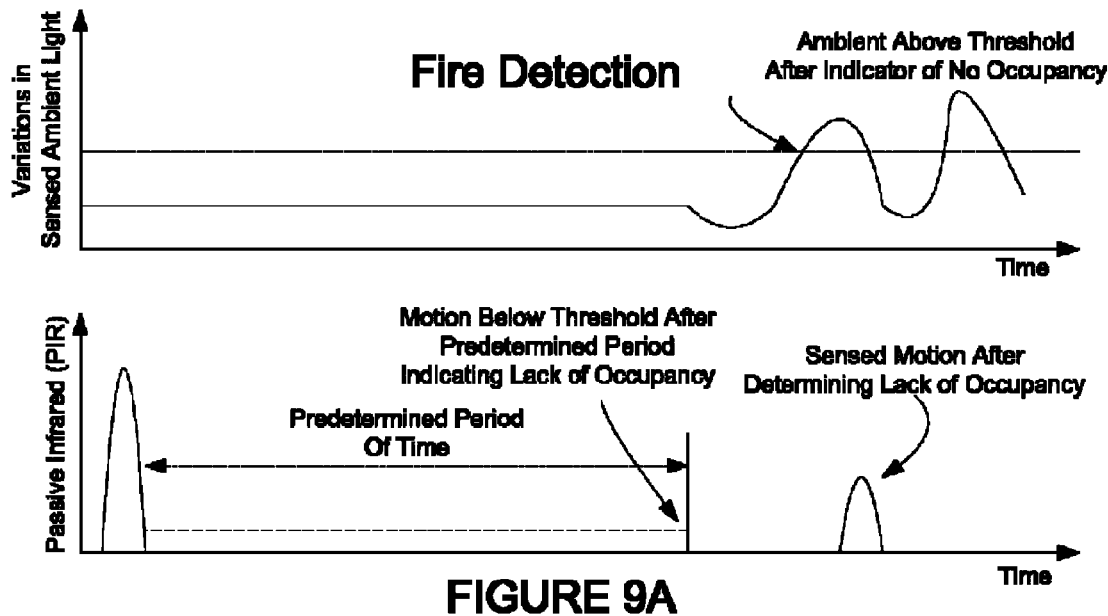
FIG. 9A shows examples of time lines showing variations in sensed ambient light and sensed passive infrared light during fire detection, according to an embodiment.
FIG. 9B is a flow chart that includes steps of a method of detecting fire, according to an embodiment.

FIG. 9A shows examples of time lines showing variations in sensed ambient light and sensed passive infrared light during fire detection, according to an embodiment. Fire Detection may be monitored by a dual-tech system that monitors both a change in variance for passive infrared in addition to a change in variance for ambient light. The infrared sensor is primary, since it detects heat from the fire. The variance (or standard deviation) from the infrared sensor may start as a seemingly benign "minor motion" event, but then grow rapidly and behave as a "major motion" event. Thus, further qualification of the event is required. The ambient sensor can further qualify the infrared event that occurred. Fluctuations in the variance of the opacity of the fire's smoke in the vicinity of the infrared source will further detect the fire, and if enough sensors are present, can pinpoint the fire to its origin.

FIG. 9B is a flow chart that includes steps of a method of detecting fire, according to an embodiment. A first step 910 includes determining a lack of occupancy by sensing motion of less than a threshold for predetermined amount of time. A second step 920 includes detecting a sensed motion of greater than the threshold after the predetermined amount of time. A third step 930 includes sensing a variation in sense ambient light of greater than a first detect threshold after the predetermined amount of time.

Figures 10A, 10B:
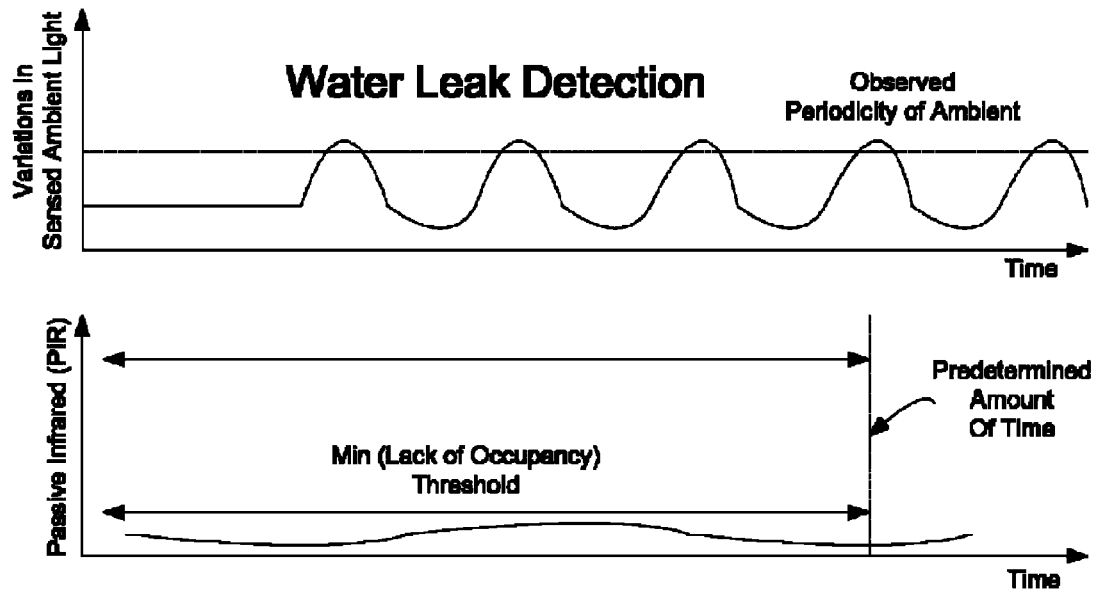
FIG. 10A shows examples of time lines showing variations in sensed ambient light and sense ultrasonic during water leak detection, according to an embodiment.
FIG. 10B is a flow chart that includes steps of a method of detecting a water leak, according to an embodiment.

FIG. 10A shows examples of time lines showing variations in sensed ambient light and sensed passive infrared light during water leak detection, according to an embodiment. Water leak detection may be monitored in kitchens where water is continuously rising in a sink, or bathrooms where water is also continuously rising in a bathroom fixture. As shown, the sensed ambient light may include an observed periodicity. Further, the sensed PIR include a sense motion signal that is continually below a minimum threshold for greater than a threshold of time, suggesting that the structure is not occupied.

FIG. 10B is a flow chart that includes steps of a method of detecting a water leak, according to an embodiment. A first step 1010 includes determining a lack of occupancy by sensing motion of less than a threshold for predetermined amount of time. A second step 1020 includes sensing a cyclic variation in sense ambient light during the predetermined amount of time.

Figure 11:
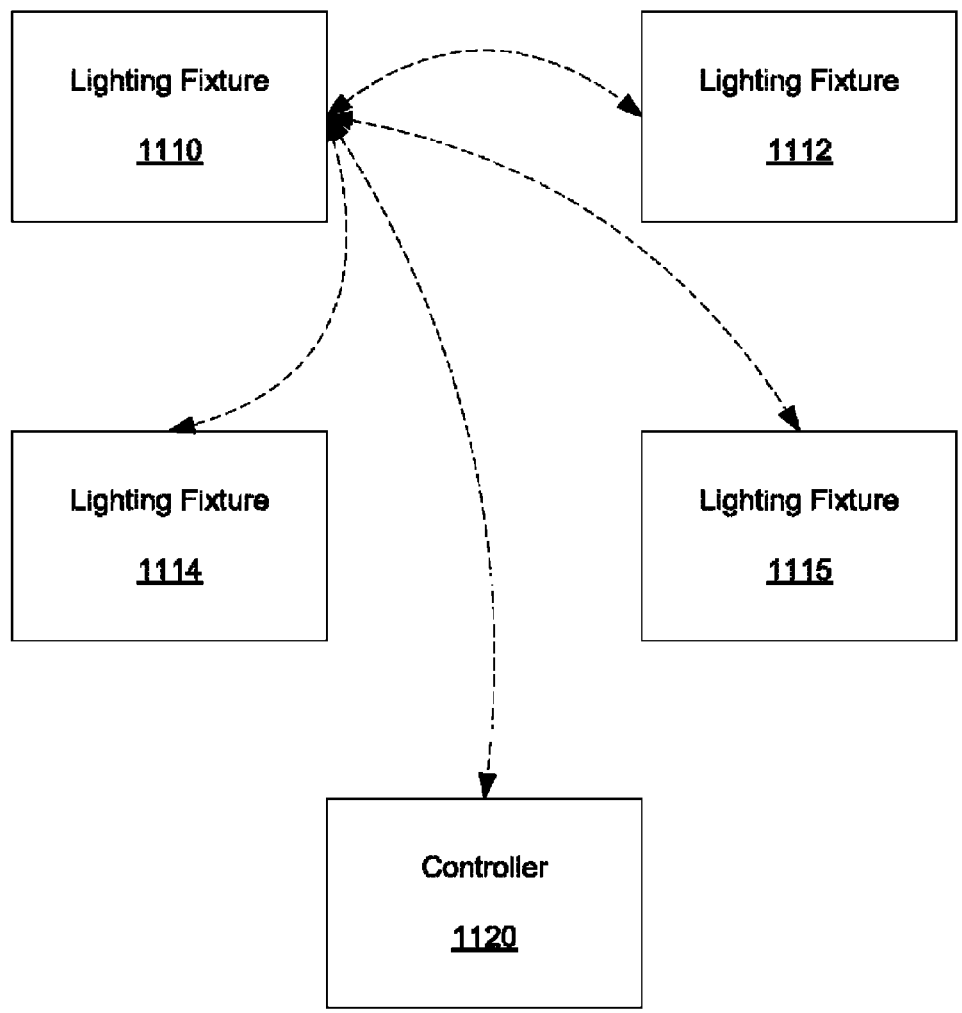
FIG. 11 shows multiple intelligent light controllers networked with a central controller, according to an embodiment.

FIG. 11 shows multiple intelligent light fixtures (which can alternatively be other types of environmental or security devices) networked with a central controller, according to an embodiment. As shown, a one of the intelligent light fixtures 1110 communicates with a controller 1120, and with other intelligent light fixtures 1112, 1114, 1115. For various embodiments, the light fixture 1110 communication at least one of the identified events as determined by the dual-technology sensors to the controller 1120, wherein the controller 1120 may be a central controller. Additionally, or alternatively, the light fixture 1110 communicates at least one of emergency condition, including the identification of smoke, fire and/or a water leak. Once alerted or informed of the identified events or emergency conditions, the controller 1120 can enable further actions. Such further actions can include, for example, triggering alarms, aiding exiting of occupants, adjusting gas, temperature, and/or lighting within the room, structure or building in which the intelligent light fixtures are located.

For at least some embodiments, the light fixtures can share sensed information amongst themselves, thereby improving the identification of occupancy, events and or emergency conditions. For example, if there are 10 fixture, it may be required that 8 of the fixtures indicated an communicate the detection of smoke before a final decision is made that smoke in fact has been detected.

Figure 12:
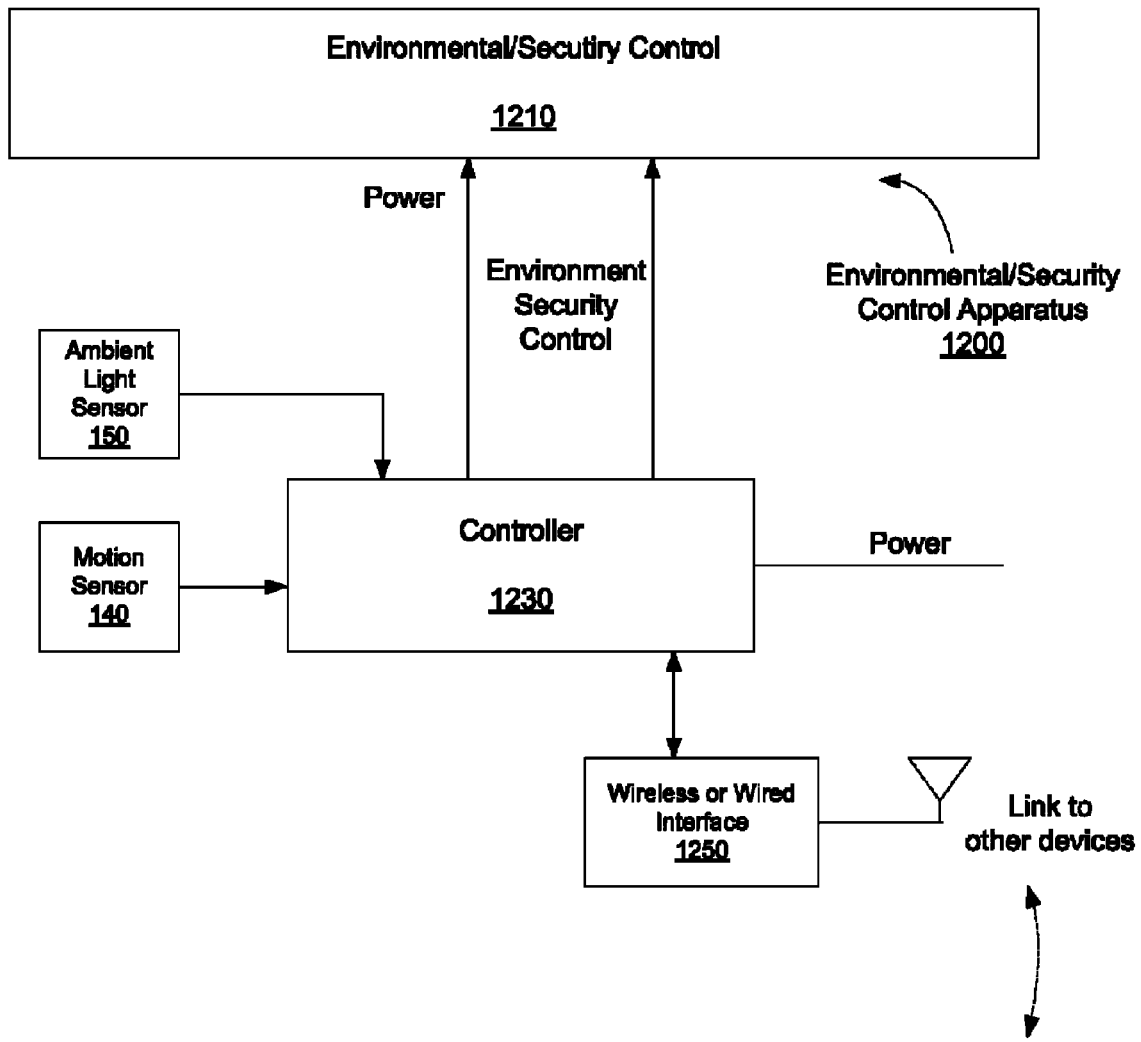
FIG. 12 shows an intelligent environment/security controller, according to an embodiment.

FIG. 12 shows an intelligent environment/security controller, according to an embodiment. FIG. 12 includes an environmental/security control 1210, and controller 1230, an interface 1250, a motion sensor 140 and an ambient light sensor 150. FIG. 12 illustrates that though the occupancy, event and/or emergency detection using the dual-technology sensors have been described in conjunction with lighting, it is to be understood that the general concepts of dual-technology sensing can be extended to controlling the environment (temperature, humidity, etc.) and/or the security of the building or structure that the dual-technology sensors are located. Once occupancy, event, sequence of events, and/or emergency conditions have been identified, many different things can be controlled based on these parameters. Additionally, what is controlled can vary between home, office or industrial structures. That is, for example, an office structure may be more concerned with lighting and human comfort control than an industrial structure which may be more concerned with safety controls.

An embodiment includes a "quick off mode" for addressing situations in which, for example, an occupant gets up and leaves a room. This event includes a unique motion signature that includes a major disruptive motion when the occupant gets up and leaves, and then a period of no major or minor motion as the occupant is no longer in the occupation sensing area. Detection of this signature can include, for example, detection of a major motion (sensing motion greater than a major threshold) and then for a preselected period of time (for example, a selected time Tqo) not detecting any motion greater than a minor motion (sensing motion less than a minor threshold). Upon detecting this sequence of events, it can be assumed that the occupancy detection area (building or structure) is unoccupied, and the building can be controlled appropriately (such as, de-activating lighting, reducing temperature control, or alerting security that the building is presently unoccupied). Operation of the "quick off mode" only requires the detection of motion. As such, a PIR sensor or the equivalent can be used to detect the described signature.

Another mode includes a slow-on mode, which is useful, for example, for ignoring an occupant (a passerby) who is passing by an office or conference room. If the controller 1230 is configured with a PIR motion sensor 140, and the controller is detecting the presence of motion with the sensor 140, an alternative mode of operation of sensing motion may be described as the ignore-passerby sensor mode. When operating in ignore-passerby, the controller is informed of a period of time, Tqo, for the ignore-passerby mode via the wireless or wired interface 1250. The controller 1230 then activates the environmental/security control 1210 only after the motion sensor 140 detects major motion PIR events for the entire Tqo period. When the elapsed time from the first major motion event equals Tqo, then the environmental/security control 1210 immediately turns-on. In a typical application subsequent motion is not subject to the Tqo wait interval.

Figure 13A:
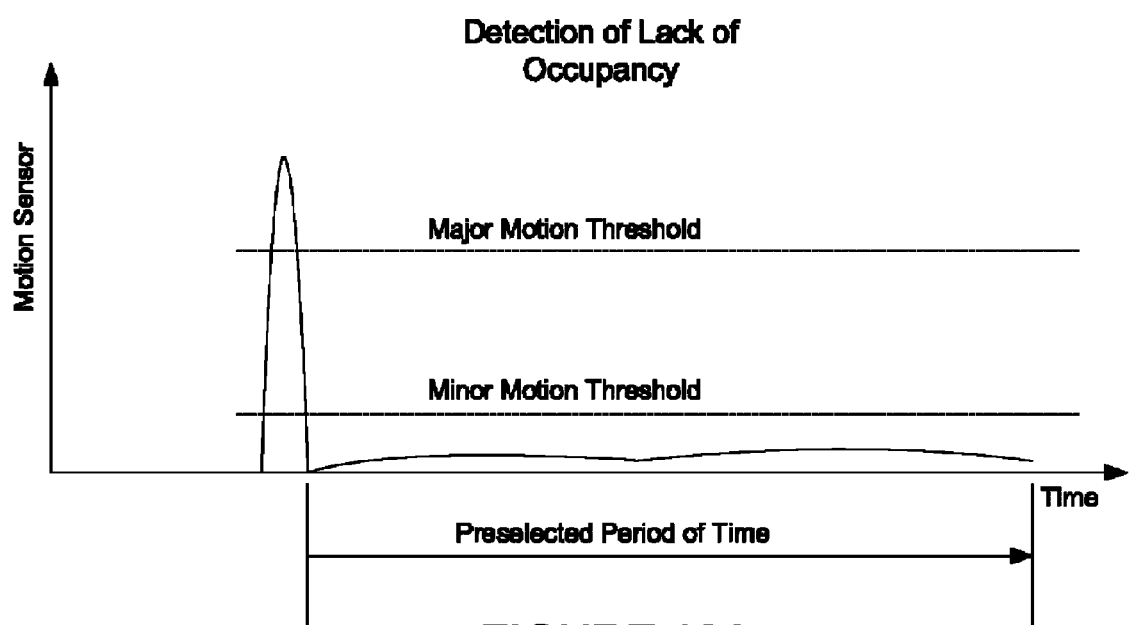
FIG. 13A is a time-line that depicts an example of the detection of motion greater than a major motion threshold, followed by the detection of motion less than a minor motion threshold for a preselected period of time after detection of the major motion.

FIG. 13A is a time-line that depicts the detection of motion greater than a major motion threshold, followed by the detection of motion less than a minor motion threshold for a preselected period of time after detection of the major motion. Occupancy, or more specifically a lack of occupancy can be determined by observing a major motion, and then a lack of a minor motion for the preselected period of time. That is, for example, a controller is operative detect a lack of occupancy if the motion sensor senses a motion above a major motion threshold, followed by sensing motion of less than a minor motion threshold for a preselected period of time after sensing motion above the major motion threshold. The motion sensing can be sensed with a motion sensor only, or additionally or alternatively utilized the ambient light sensor. That is, the dual-technology embodiments described can be utilized, or even a single motion sensing technology can be utilized.

Figure 13B:
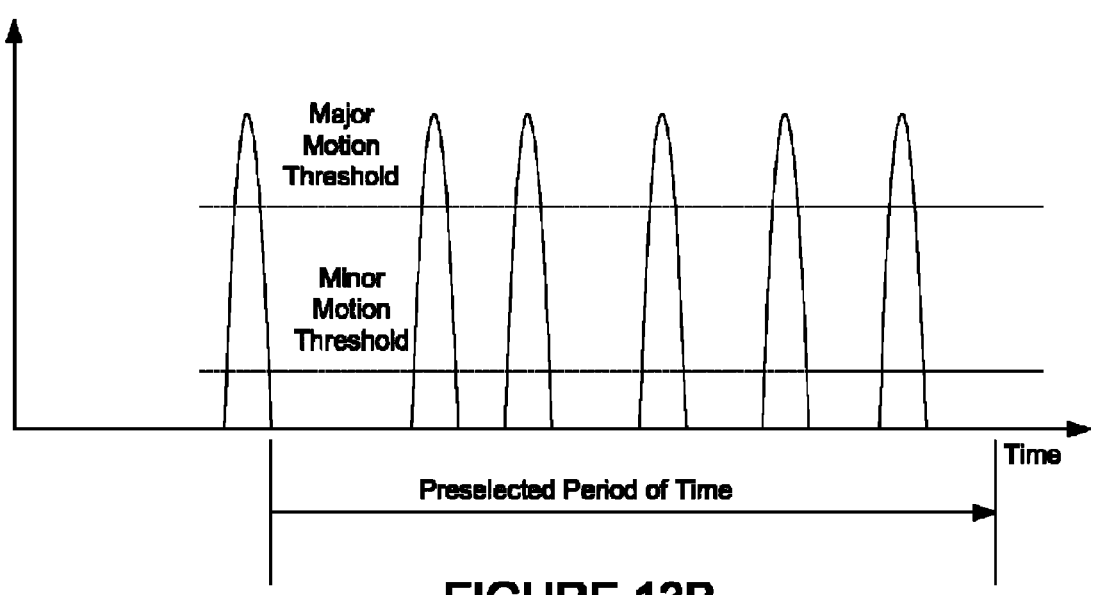
FIG. 13B is a time-line that depicts a sequence of a slow-on or ignore-passerby mode, according to an embodiment.

FIG. 13B is a time-line that depicts a sequence of a slow-on or ignore-passerby mode. Here, the motion greater that a threshold is sensed continuously for greater than a time threshold. If the motion is greater than the major motion threshold for less than the predetermined time, it is assumed that the motion was caused by a "passerby" and the controls should not react. However, if the major motion lasts for a time duration of greater than the predetermined time, then it is assumed that an actual occupant has been sensed, not a passerby, and the lighting/environmental controls should respond accordingly. That is, if the major motions of FIG. 13B persist past the preselected period of time, an occupant is detected. However, if the major motions of FIG. 13B do not persist after the preselected period of time, a passerby is detected.

Although specific embodiments have been described and illustrated, the described embodiments are not to be limited to the specific forms or arrangements of parts so described and illustrated. The embodiments are limited only by the appended claims.

What is claimed:

1. A dual-technology occupancy detection apparatus, comprising:
   a motion sensor sensing motion, wherein the motion sensor is operative to generate N digital samples of the sensed motion;
   an ambient light sensor sensing motion and presence of a person by sensing variation in ambient light;
   a controller operative to:
   detect occupancy and control a building environmental parameter based on the sensed motion of the motion sensor and the sensed motion and presence of the person as indicated by the sensed variations in ambient light;

match the N digital samples of the sensed motion with one of a plurality of stored patterns of events; and identify an event associated with the sensed motion based on a match between a one of the plurality of patterns and the N digital samples of the sensed motion.

2. The apparatus of claim 1, wherein the building environmental parameter includes activation and intensity of a light.

3. The apparatus of claim 1, wherein the building environmental parameter includes temperature.

4. The apparatus of claim 1, wherein the building environmental parameter includes security control.

5. The apparatus of claim 1, wherein the sensing motion comprises a PIR (passive infrared) motion sensor sensing the motion.

6. The apparatus of claim 1, further comprising the controller operative to activate the light for a predetermined period of time upon the motion sensor sensing motion greater than a threshold.

7. The apparatus of claim 6, further comprising the controller operative to extend the activation of the light beyond the predetermined period if the ambient light sensor senses variations in ambient light greater than a second threshold.

8. The apparatus of claim 6, further comprising the controller operative to over-ride the activation of the light within the predetermined period if the ambient light sensor senses variations in ambient light less than the threshold.

9. The apparatus of claim 1, wherein N is a power of two.

10. The apparatus of claim 1, wherein the motion sensor comprises an IR sensor, and further comprising the controller operative to:

detect occupancy and control activation of the light based on the sensed motion and the sensed variations in ambient light.

11. The apparatus of claim 1, further comprising the controller operative to identify a fire within a structure in which the motion sensor and the ambient light sensor are located, comprising, the controller identifying a following sequence of events:

determine a lack of occupancy by sensing motion of less than a threshold for a predetermined amount of time;

detect a sensed motion of greater than the threshold after the predetermined amount of time;

sense a variation in sensed ambient light of greater than a first detect threshold after the predetermined amount of time.

12. The apparatus of claim 11, further comprising a plurality of motion sensors and a plurality of ambient light sensors, and wherein the fire is detected if at least N of M motion sensors and ambient light sensors detect the sequence of events.

13. The apparatus of claim 11, further comprising the controller communicating a fire alert to an external controller if fire is identified.

14. The apparatus of claim 1, further comprising the controller operative to identify smoke within a structure in which the motion sensor and the ambient sensor are located, comprising the controller operative to identify a following sequence of events:

determine a lack of occupancy by sensing motion of less than a threshold for a predetermined amount of time;

sense a variation in sense ambient light of greater than a first detect threshold after the predetermined amount of time.

15. The apparatus of claim 14, further comprising a plurality of motion sensors and a plurality of ambient light sensors, and wherein the smoke is identified if at least N of M motion sensors and ambient light sensors detect the sequence of events.

16. The apparatus of claim 14, further comprising the controller communicating a smoke alert to an external controller if smoke is identified.

17. The apparatus of claim 1, further comprising the controller operative to identify a water leak within a structure in which the motion sensor and the ambient sensor are located, comprising the controller operative to identify a sequence of events comprising:

determine a lack of occupancy by sensing motion of less than a threshold for a predetermined amount of time;

sense a cyclic variation in sensed ambient light during the predetermined amount of time.

18. The apparatus of claim 17, further comprising the controller operative to communicate water leak alert to an external controller if a water leak is detected.

19. The apparatus of claim 17, further comprising a plurality of motion sensors and a plurality of ambient light sensors, and wherein the water leak is identified if at least N of M motion sensors and ambient lights sensor detect the sequence of events.

20. The apparatus of claim 1, further comprising the controller detecting a lack of occupancy if the motion sensor senses a motion above a major motion threshold, followed by sensing motion of less than a minor motion threshold for a preselected period of time after sensing motion above the major motion threshold.

21. The apparatus of claim 1, further comprising the controller operative to:

light harvesting upon sensing ambient light greater than a threshold, wherein light harvesting comprises reducing an intensity of a light when ambient light is sensed greater than the threshold;

over-riding the light harvesting if the sensed ambient light greater than the threshold occurs during a period in which motion is sensed greater than an occupancy threshold.

22. A method of a dual-technology fixture detecting occupancy, comprising:

sensing motion with a motion sensor, wherein the motion sensor is operative to generate N digital samples of the sensed motion;

sensing motion and presence of a person by sensing variations in ambient light with an ambient light sensor;

detecting occupancy and controlling activation of a building parameter based on the sensed motion of the motion sensor and the sensed motion and presence of the person as indicated by the sensed variations in ambient light;

matching the N digital samples of the sensed motion with one of a plurality of stored patterns of events; and identifying an event associated with the sensed motion based on a match between a one of the plurality of patterns and the N digital samples of the sensed motion.

23. The method of claim 22, wherein the building parameter comprises activation of a light, and further comprising activating the light for a predetermined period of time upon sensing motion greater than a threshold.

24. The method of claim 23, further comprising extending the activation of the light beyond the predetermined period if the ambient light is sensed to have variations greater than a threshold.

25. The method of claim 23, further comprising over-riding the activation of the light within the predetermined period if the ambient light is sensed to have variations less than the threshold.

26. The method of claim 23, further comprising:
sensing motion with an IR sensor;
detecting occupancy and controlling activation of the light based on the sensed motion and the sensed variations in ambient light.

27. The method of claim 22, further comprising identifying a fire within a structure in which the motion sensor and the ambient sensor are located, comprising, identifying a following sequence of events:
determining a lack of occupancy by sensing motion of less than a threshold for a predetermined amount of time;
detecting a sensed motion of greater than the threshold after the predetermined amount of time;
sensing a variation in sense ambient light of greater than a first detect threshold after the predetermined amount of time.

28. The method of claim 22, further comprising identifying smoke within a structure in which a plurality of motion sensors and a plurality of ambient sensors are located, comprising identifying a following sequence of events:
determining a lack of occupancy by sensing motion of less than a threshold for a predetermined amount of time;
sensing a variation in sense ambient light of greater than a first detect threshold after the predetermined amount of time.

29. The method of claim 22, further comprising identifying a water leak within a structure in which a plurality of motion sensors and a plurality of ambient sensors are located, comprising identifying a following sequence of events:
determining a lack of occupancy by sensing motion of less than a threshold for a predetermined amount of time;
sensing a cyclic variation in sense ambient light during the predetermined amount of time.

30. A dual-technology occupancy detection apparatus, comprising:
a motion sensor sensing motion;
an ambient light sensor sensing motion and presence of a person by sensing variation in ambient light;
a controller operative to:
detect occupancy and control a building environmental parameter based on the sensed motion of the motion sensor and the sensed motion and presence of the person as indicated by the sensed variations in ambient light;
activate the light for a predetermined period of time upon the motion sensor sensing motion greater than a threshold; and
extend the activation of the light beyond the predetermined period if the ambient light sensor senses variations in ambient light greater than a second threshold.

* * * * *